United States Patent [19]
Laithwaite et al.

[11] 3,824,414
[45] July 16, 1974

[54] SECONDARY MEMBER FOR SINGLE-SIDED LINEAR INDUCTION MOTOR

[75] Inventors: Eric Roberts Laithwaite, Long Ditton; Thomas George Fellows, Barnet, both of England

[73] Assignee: Tracked Hovercraft Limited, London, England

[22] Filed: Mar. 13, 1973

[21] Appl. No.: 340,721

[30] Foreign Application Priority Data
Mar. 15, 1972 Great Britain................ 12073/72

[52] U.S. Cl............................. 310/13, 104/148 LM
[51] Int. Cl. ......................................... H02k 41/02
[58] Field of Search ......... 310/12, 13; 104/148 LM; 318/687, 38, 135

[56] References Cited
UNITED STATES PATENTS

| | | | |
|---|---|---|---|
| 3,585,423 | 6/1971 | Bolton et al. | 310/13 |
| 3,628,072 | 12/1971 | Nicholson | 310/13 |
| 3,648,084 | 3/1972 | Laithwaite | 310/13 |
| 3,667,397 | 6/1972 | Haynes | 310/13 X |
| 3,667,398 | 6/1972 | English | 310/13 X |

*Primary Examiner*—Gerald Goldberg
*Attorney, Agent, or Firm*—Cameron, Kerkam, Sutton, Stowell & Stowell

[57] ABSTRACT

The secondary of a single-sided, short-stator linear induction motor is formed in sections, for example, with expansion joints between sections. At the discontinuities, the ends of the reaction plate are turned down to provide return paths for circulating induced currents in the vicinity of the discontinuities.

7 Claims, 4 Drawing Figures

SECONDARY MEMBER FOR SINGLE-SIDED LINEAR INDUCTION MOTOR

This invention relates to the secondary member in or for a linear induction motor of the "single-sided" variety, that is to say, in which the return path for working flux generated by an energising winding on a magnetic core structure of the primary member is provided by magnetic material of the secondary member rather than by a further magnetic core structure of the primary member. The secondary member is both magnetic and electrically conductive and in essence has the primary member disposed adjacent one only of its sides. (In contrast, a linear induction motor of the "double-sided" variety has a two-part primary member each part of which has a magnetic core structure; for operation the two parts of the primary member are arranged to straddle the cooperating secondary member which has the form of an electrically conductive and nonmagnetic fin.) The secondary member may have its electrically conductive and magnetic properties provided by different members specially provided; alternatively, however, a single member may be used.

Even more particularly the invention relates to a single-sided linear induction motor secondary member of the kind which is elongate and extends along a track for cooperation with one or more linear induction motor primary members which are supported to move along the track in spaced relation thereto as, for example, by a tracked gas cushion vehicle. Such an arrangement for linear induction motor is commonly known as a "short stator" arrangement because the length of the "stator" (i.e., primary member) is small in relation to the length of the secondary member or "rotor."

In accordance with the present invention there is provided a secondary member for a single-sided, short-stator linear induction motor, comprising a plurality of generally planar members arranged end to end and having discontinuities therebetween, at at least one of the discontinuities, the said members terminating in end portions which lie to one side of the said members and serve in operation to provide paths for induced current flow in the neighbourhood of the discontinuities in response to the working magnetic flux created by a single-sided linear induction motor primary member arranged for movement along the secondary member in generally spaced relation to the side thereof remote from the said end portions.

Preferably the end portions lie in generally transverse planes so as to confront one another in generally parallel relation across the discontinuities. Each end portion may be integral with the remainder of its respective member. As an alternative, however, it may be initially separate and then welded into position.

In order that the invention may be more fully understood, a linear induction motor secondary member in accordance with the invention will now be described, by way of example, with reference to the accompanying drawings, in which.

Figure 1:
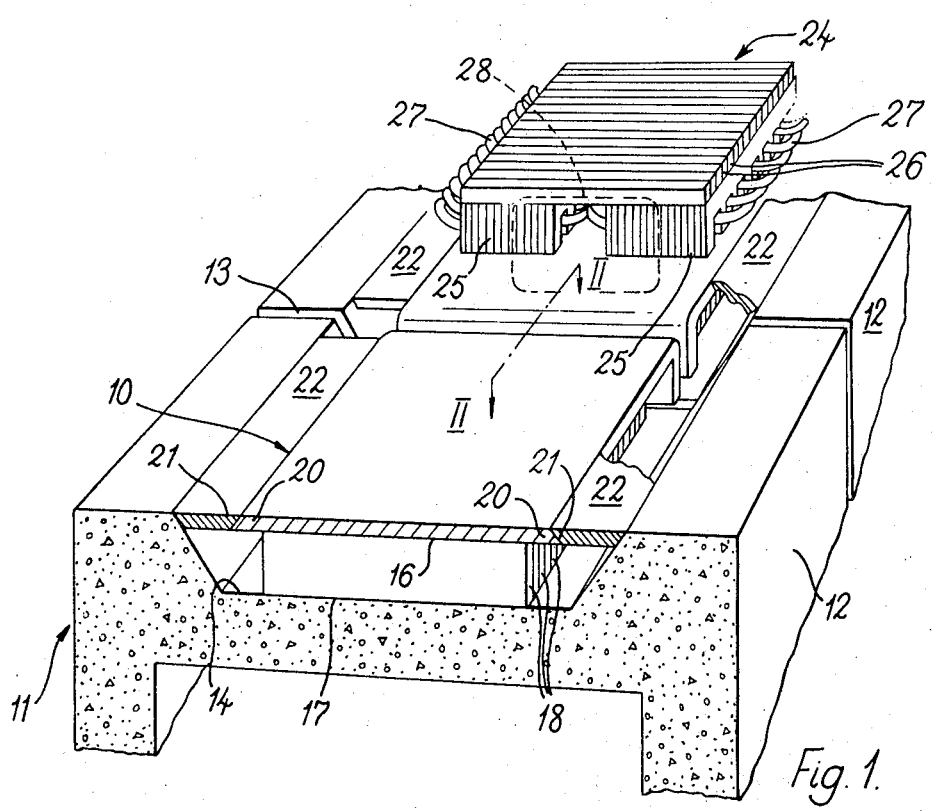
FIG. 1 is a perspective view of a typical part of the secondary member, showing an expansion gap formed in the track along which the secondary member extends; also visible is a single-sided linear induction motor primary member arranged for cooperation with the secondary member.
Figure 2:
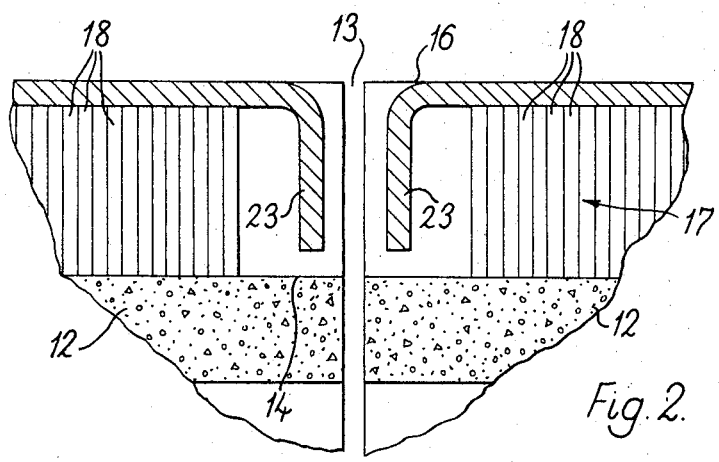
FIG. 2 shows in detail the arrangement of the secondary member in the neighbourhood of the expansion gap, being a view in part-section along the line II — II OF FIG. 1.

Referring now to FIGS. 1 and 2, a linear induction motor secondary member 10 extends along an elevated concrete track 11 formed of hollow beams 12 of generally rectangular cross-section and simply supported so as to lie end-to-end with expansion gaps 13 between adjacent ends; one expansion gap 13 is visible in FIGS. 1 and 2. The track 11 may be hundreds of miles in length.

The secondary member is received in a channel 14 formed centrally along the top of the track and generally comprises a horizontal reaction plate 16 of rolled aluminium alloy (or other electrically conductive) sheet, and, interposed between the reaction plate and the bottom of the channel 14, magnetic material 17 formed of transverse magnetic laminations 18.

The secondary member is formed with expansion gaps corresponding longitudinally to the gaps 13 formed in the track, so that each beam 12 has an associated section of secondary member. Although it is not apparent from the drawing, at the midpoints of the beams the sections of secondary member have their associated sections of reaction plate 16 and magnetic material 17 secured to the track. Apart from this central location, however, the sections of secondary member are free to move longitudinally of the track as a result of differential thermal expansion and contraction.

The reaction plate 16 has its top surface flush with the top surface of the track and overhangs the magnetic material 17 along the sides of the secondary member at overhanging portions 20 having chamferred edges 21 (FIG. 1). Wedge pieces 22 engage the edges 21 and the neighbouring sides of the channel 14 and are forced downwardly towards the track by means not shown so as to provide vertical location for the reaction plate and thereby the secondary member as a whole. The previously described longitudinal movement between the secondary member and the track is, so far as the reaction plate 16 is concerned, accommodated by sliding movement between the reaction plate and the wedge pieces 22 at the edges 21.

FIG. 2 illustrates in detail the arrangement of the secondary member at each expansion gap 13. At each of its ends each section of secondary member has the reaction plate formed with a turned-down portion 23 which extends vertically downwards beyond the end of the magnetic material 17. The portions 23 are formed from the plane aluminum alloy sheet by a suitable bending operation and are of a length to stop just short of the bottom of the channel 14.

Along the length of track the spacings between pairs of adjacent turned-down portions 23 at the expansion gaps 13 are of a size to accommodate any thermal expansion of the reaction plate 16 caused by operation and/or solar heating. Likewise, each portion 23 is made to overhang the respective end of the magnetic material 17 by an amount sufficient to accommodate relative expansion and contraction of the reaction plate and the magnetic material.

For operation a vehicle such as a gas cushion or wheeled vehicle is arranged to travel along the track supported and guided thereby. The vehicle (not shown) carries beneath it a linear induction motor primary member. The primary member may be of the kind disclosed and claimed in any of U.S. Pat. Nos. 3,585,423, 3,628,072 and 3,770,995, that is to say, it is so adapted that at least part of the working (i.e., effective) flux created by its energising winding passes generally transversely of the motor.

In FIG. 1 a typical linear induction motor primary member which may be used with the secondary member 10 is shown diagrammatically and indicated by the reference numeral 24. It basically comprises two laterally spaced stacks 25 of longitudinally orientated, vertical magnetic laminations and a plurality of longitudinal spaced stacks 26 of transverse magnetic laminations which magnetically bridge the stacks 25. Each stack 25 is formed with a conventional two-layer, lap-wound energising winding 27, and for operation these two windings 27 are energised in transverse antiphase from a three-phase a.c. supply to drive working flux around the primary secondary magnetic circuit provided by the magnetic material 25, 26 of the primary member in combination with the magnetic material 17 of the secondary member 10. The major part of the working flux passes transversely of the motor, in flux paths as indicated by the broken line 28 in FIG. 1. Some working flux passes longitudinally of the motor as a result of each energising winding operating separately but for clarity this longitudinal flux is omitted from the drawing.

Figure 3:
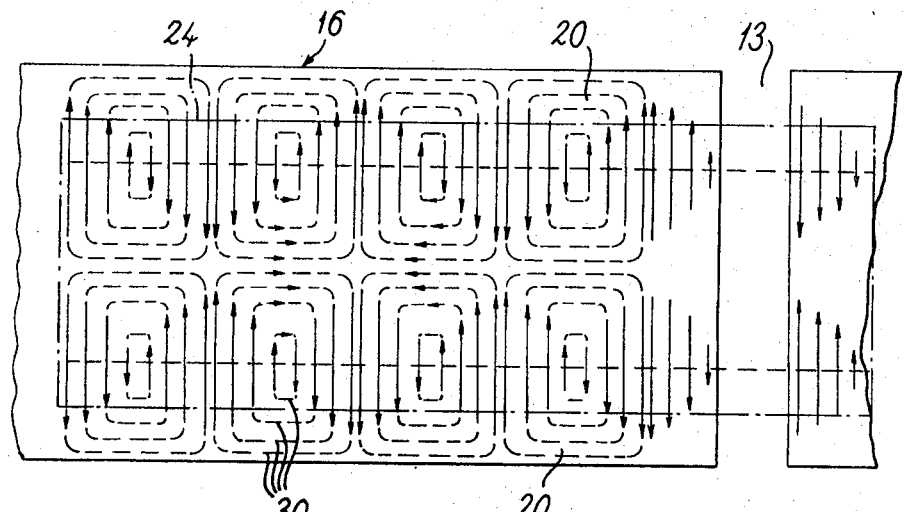
FIG. 3 is a plan view of the portion of secondary member shown in FIG. 1 when symbolically marked with the voltages and currents typically induced by the primary member when disposed above the expansion gap.

FIG. 3 is a plan view of the portion of reaction plate 16 shown in FIG. 1. The arrows represent the magnitude and sense of the voltages which are induced in the reaction plate by the working flux at a particular moment of time during movement of the primary member 24 along the reaction plate; the two lines of arrows correspond to the two lamination stacks 25.

For each stack 25 the magnitude of the voltages induced in the reaction plate varies sinusoidally along the reaction plate, the period of this sinusoidal variation corresponding spacially to two pole pitches of the supply to the associated energising winding 27. As a result of this sinusoidal variation in voltage currents are caused to flow in the reaction plate, and in known manner these currents react with the working flux to produce propulsive force to propel the vehicle carrying the primary member 24 along the track 11.

Generally speaking, current flow in the reaction plate 16 is in essentially rectangular current paths in a pattern corresponding to the poles of the applied magnetic field. Such paths are exemplified in the drawing by the concentric group of current paths corresponding to one pole of the applied field and indicated in FIG. 3 by the reference numeral 30. From the drawings it will be seen that the longitudinally directed parts of the current paths along the two sides of the reaction plate are provided by the overhanging portions 20; the portions 20 accordingly serve not only to provide a means for securing the secondary member to the track as previously described, but also to allow the current paths to be substantially rectangular, as is required for maximum propulsive force.

At each expansion gap 13 the reaction plate 16 is interrupted so that the normal current paths 30 cannot exist. Because the voltages induced in the reaction plate adjacent each gap 13 represent a potential increment of propulsive force and in order to reduce the variation in the net vertical force between the primary and secondary members, it is desirable that paths be provided for allowing current flow in the neighbourhood of the gap despite the break in the reaction plate, these paths being of a low resistance which at least approaches that of the normal current paths 30 described above.

In an attempt to make the reaction plate electrically continuous it has been proposed in such circumstances electrically to bridge each expansion gap by flexible connectors. This arrangement, however, has been found to be unsatisfactory in several respects; first, unless the connectors are integrally bonded (e.g., welded) to the reaction plate each interface between connector and reaction plate is liable to constitute a relatively high resistance which substantially reduces the desired current flow through the connector and so makes the connector relatively ineffective; secondly, the connectors prevent the sections of reaction plate from being moved relative to one another for track switching and other purposes; and, thirdly, the connectors are relatively fragile and liable to fracture.

Figure 4:
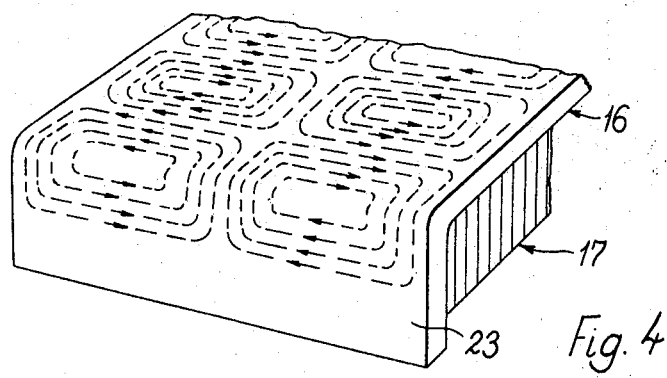
FIG. 4 is a perspective view corresponding to FIG. 3 and illustrating a typical voltage and current distribution in the secondary member at one side of the expansion gap.

The turned-down portions 23 obviate the need for such flexible connectors because of the low resistance paths they provide for current flow due to voltages induced in the adjacent and respective parts of the reaction plate; FIG. 4 shows the current flow path in the turned-down portion 23 (not visible) on the left hand side of the expansion gap in FIG. 3. The turned-down portions are extended downwardly to end just short of the bottom of the channel 14. Not only do they to some extent protect the magnetic material 17 from the weather but they may also serve to provide location for sponge rubber or like material which may be used to occupy the expansion gap. A further function of the turned down portions 23 is to act as a barrier to prevent flux from passing directly between the primary member 24 and the magnetic material 17 at the expansion gaps 13, and by so doing to further reduce the variations in the net vertical force produced between the primary and secondary members as the primary member crosses the gaps. Although shown as vertical the turned-down portions 23 may be inclined to the vertical if desired.

In a modification of the reaction plate 16 the overhanging portions 20 and that part of the plate lying between the stacks 25 of the primary member are thickened. In order to facilitate the formation of the turned-down portions 23 the thickened portions of the reaction plate may be relieved at the underside of the plate where the bends are to occur.

In a further modification of the reaction plate 16 the portions 23 are initially separate and attached by welding instead of being integral and formed by bending as described.

In yet another modification of the described embodiment each section of reaction plate is subdivided into two equal lengths which are laid end-to-end and are individually secured to the midpoint of the associated beam at their adjacent ends so as each to provide one of the two turned-down portions 23 at their other ends.

Although as described the invention has particular application to the secondary member of a single sided linear induction motor of which at least part of the working flux is transversely orientated, the invention may nevertheless have some application to the more conventional type of motor in which the working flux is essentially longitudinal. The magnetic material of the secondary member may then be laminated longitudinally.

Further possible alternatives for the secondary member are unlaminated magnetic material (with a separate reaction plate); and a material which is both magnetic and electrically conductive and serves both functions. In one such arrangement the secondary member is merely comprised of a plurality of iron plates arranged end-to-end and each having turned-down ends.

A secondary member in accordance with the invention may have its electrically conductive material provided by members of ladder-like configuration rather than by members of sheet material as described. Thus a turned-down portion of a secondary member in accordance with the invention may be formed with one or more apertures.

Although the invention has been particularly described with one particular orientation of secondary member (i.e., essentially horizontal), any suitable orientation may be used.

We claim:

1. In a single-sided, short stator linear induction motor having a primary member and a secondary member, the secondary member comprising a plurality of generally planar members of electrically conductive material arranged end-to-end and having discontinuities therebetween, the said members terminating, at at least one of the discontinuities, in end portions which lie to one side of the planes of said members and serve in operation to provide paths for induced current flow in the neighbourhood of the discontinuities in response to the working magnetic flux created by movement of the primary member along the secondary member in generally spaced relation to the side thereof remote from the end portions.

2. A secondary member as claimed in claim 1, in which the end portions lie in generally transverse planes so as to confront one another in generally parallel relation across the discontinuities.

3. A secondary member as claimed in claim 2, in which each of the end portions is integral with the remainder of its respective member.

4. A secondary member as claimed in claim 2, in which each of the end portions is welded into position on the remainder of its respective member.

5. A secondary member as claimed in claim 1, in which said electrically conductive material is also a magnetic material.

6. A secondary member as claimed in claim 1, in which said electrically conductive material is a non-magnetic material and a respective member of magnetic material is disposed abutting each of said generally planar members on the same side thereof as said end portions.

7. A secondary member for a single-sided, short-stator linear induction motor comprising a plurality of generally planar members of electrically conductive material arranged end-to-end and having a discontinuities therebetween, the said members terminating, at at least one of the discontinuities, in end portions which lie to one side of the planes of said members.

* * * * *